United States Patent
Fukuda et al.

(10) Patent No.: US 6,175,461 B1
(45) Date of Patent: Jan. 16, 2001

(54) ROTARY HEAD BLOCK WITH ROTARY TRANSFORMER HAVING SEPARATE CHANNELS FOR POWER SIGNAL AND PLAYBACK SIGNAL

(75) Inventors: Shinichi Fukuda; Masahiro Suzuki; Toshihiro Kawakubo, all of Kanagawa; Masanori Okazaki, Tokyo, all of (JP)

(73) Assignee: Sony Corporation, Tokyo (JP)

( * ) Notice: Under 35 U.S.C. 154(b), the term of this patent shall be extended for 0 days.

(21) Appl. No.: 09/090,806

(22) Filed: Jun. 4, 1998

(30) Foreign Application Priority Data

Jun. 6, 1997 (JP) .................................................. 9-149387

(51) Int. Cl.$^7$ .................................................. G11B 15/14
(52) U.S. Cl. .................................. 360/64; 66/272; 66/281
(58) Field of Search .................................. 360/66, 64, 108, 360/272, 281, 46, 67

(56) References Cited

U.S. PATENT DOCUMENTS

| | | | |
|---|---|---|---|
| 3,771,014 | * 11/1973 | Paget | 315/136 |
| 4,605,974 | * 8/1986 | Ochi et al. | 360/64 X |
| 4,851,935 | 7/1989 | Ohyama et al. | |
| 4,926,273 | * 5/1990 | Tabuchi et al. | 360/64 |

FOREIGN PATENT DOCUMENTS

| | | |
|---|---|---|
| 0660305 | 12/1994 | (EP) . |
| 2272100 | 11/1993 | (GB) . |
| 2191327 | 5/1997 | (GB) . |
| 9304470 | 8/1992 | (WO) . |

* cited by examiner

Primary Examiner—Alan T. Faber
(74) Attorney, Agent, or Firm—Jay H. Maioli (57) ABSTRACT

A reproduction initial stage amplifier at the rotary side of a rotary head apparatus, prevents an adverse affect of a power transmission signal to a reproduction channel, operates such that a signal from a reproduction head 11 of a rotary head 10 is supplied via a reproduction initial stage amplifier 12 and via windings 22b and 22a of a rotary transformer 20 to a reproduction system 41 of the fixed side. A power signal from a power supply circuit 30 is supplied via windings 21a and 21b of the rotary transformer 20 to a rectifier circuit 15. A rectified output from the rectifier circuit 15 is supplied via a capacitor 16 for power accumulation to a regulator 17, so as to be subjected to voltage stabilization for supply to the reproduction initial stage amplifier 12. During a reproduction operation of the reproduction head 11, a control circuit 42 halts power supply from the power supply circuit 30 and a power accumulated in the capacitor 16 is supplied to the reproduction initial stage amplifier 12.

6 Claims, 14 Drawing Sheets

FIG.1

(PRIOR ART)

FIG.2

(PRIOR ART)

FIG.3

(PRIOR ART)

(PRIOR ART)

FIG.7

(PRIOR ART)

FIG.14A OUTPUT ENABLE

ROTARY HEAD BLOCK WITH ROTARY TRANSFORMER HAVING SEPARATE CHANNELS FOR POWER SIGNAL AND PLAYBACK SIGNAL

BACKGROUND OF THE INVENTION

1. Field of the Invention

The present invention relates to a signal reproduction apparatus and method in which a signal transmission between a rotary side and a fixed side of a rotary head apparatus is carried out via a rotary transformer and in particular, to a signal reproduction apparatus and method involving a rotary drum having a reproduction amplifier.

2. Description of the Prior Art

Figure 1:
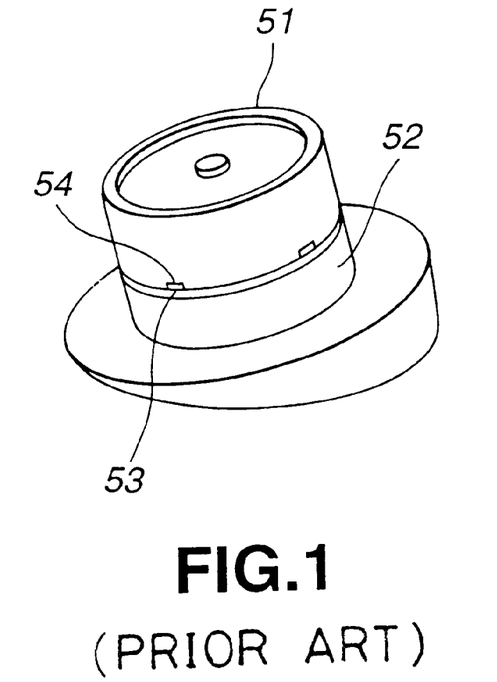
FIG. 1 is a perspective view showing a simplified configuration of a helical scan type rotary head apparatus.

In a DAT (digital audio tape recorder), VTR, and the like, a so-called helical scan type rotary head apparatus is known. FIG. 1 shows a brief configuration of such a helical scan type rotary head apparatus as an example, including a rotary drum 51 and a fixed drum 52. A magnetic head 53 for recording and reproduction is arranged so as to be exposed through a window 54 at the outer circumference of the rotary drum 51.

Figure 2:
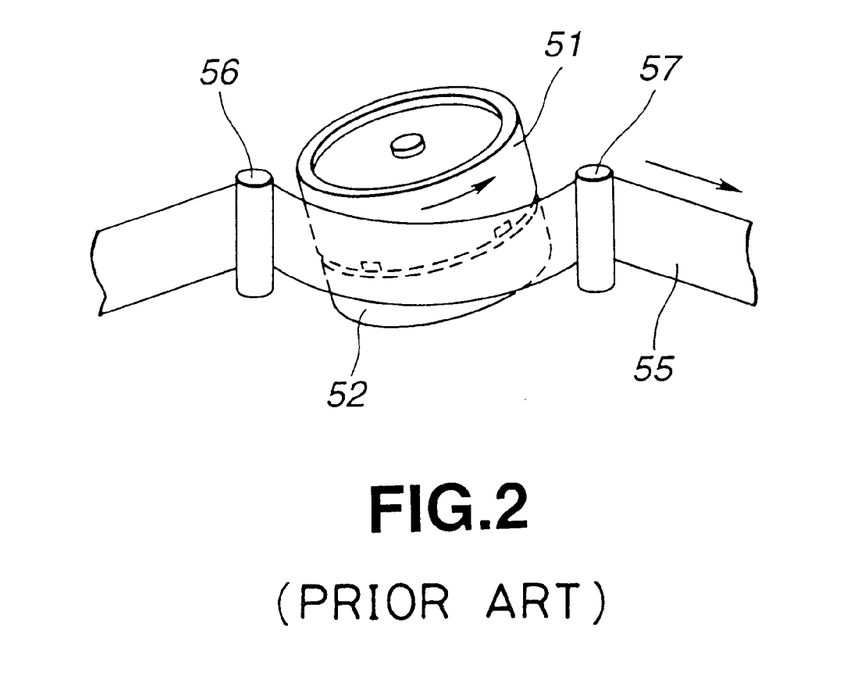
FIG. 2 is a perspective view showing a guided tape running state in a helical scan type rotary head apparatus.

FIG. 2 shows a guide running state of a magnetic tape 55. The magnetic tape 55 is guide and driven to run in an inclined direction along the outer circumference of the rotary drum 51 and the fixed drum 52. The magnetic head of the rotary drum 51 carries out recording/reproduction while scanning the magnetic tape 55 in an inclined direction with respect to the tape running direction.

Transmission of a recording/reproduction signal for the recording/reproduction head of the rotary drum is carried out via a rotary transformer. A recording output amplifier and a reproduction initial stage amplifier are normally arranged outside of the drum.

Figure 3:
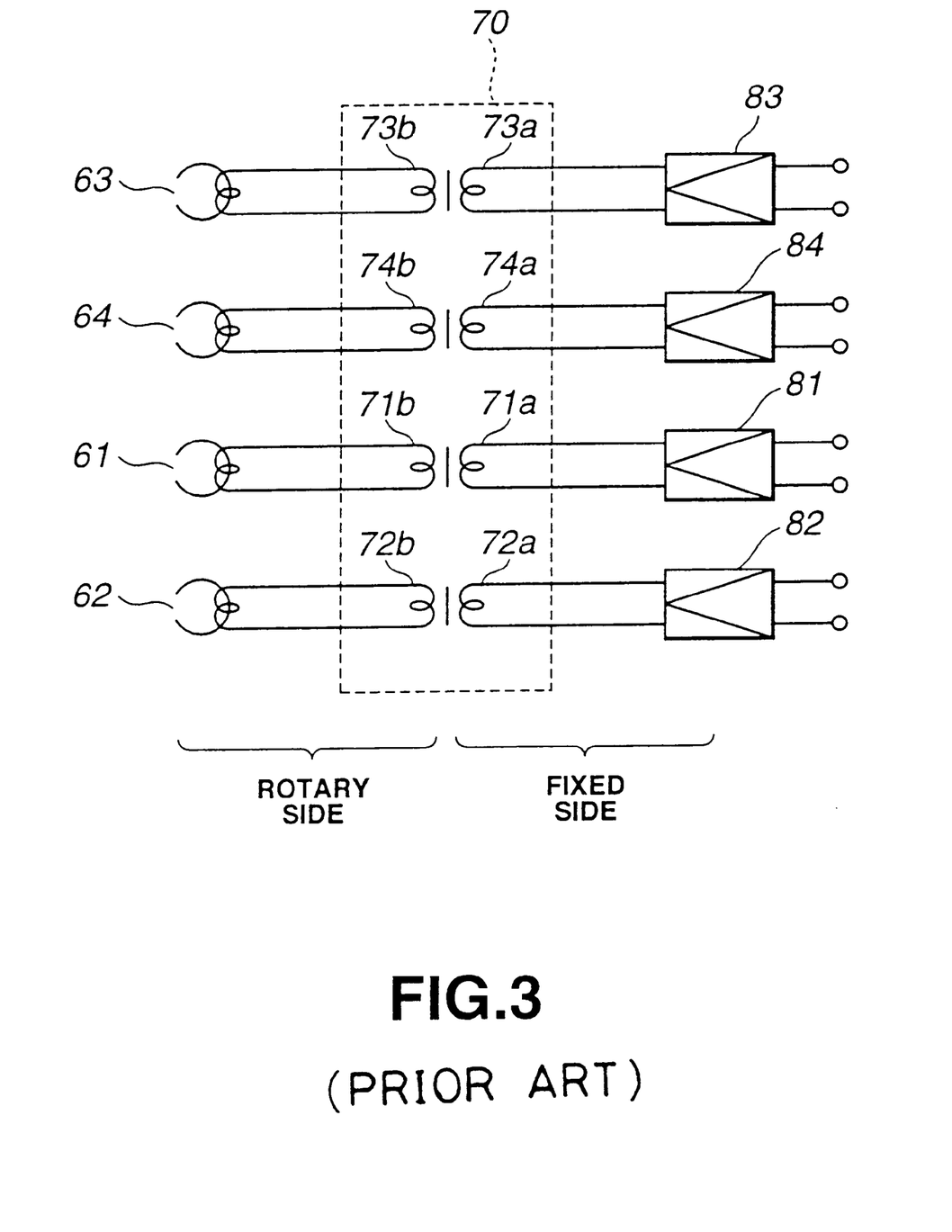
FIG. 3 is a circuit diagram schematically showing a connection state between a rotary drum recording/reproduction head and a recording/reproduction amplifier.

FIG. 3 is a block diagram showing a circuit for connection between the recording/reproduction head of the rotary drum and the recording/reproduction amplifier. In FIG. 3, reproduction heads 61, 62 arranged at the rotary side such as the aforementioned rotary drum are respectively connected via windings 71, 72 of the rotary transformer 70 to reproduction initial stage amplifiers 81, 82 of the fixed side, whereas recording heads 63, 64 of the rotary side are respectively connected via windings 73, 74 of the rotary transformer 70 to recording amplifiers 83, 84 of the fixed side. It should be noted that in FIG. 3, each of the windings of the rotary transformer 70 is denoted by a reference numeral having a subscript "a" for the fixed side and a subscript "b" for the rotary side.

Figure 4:
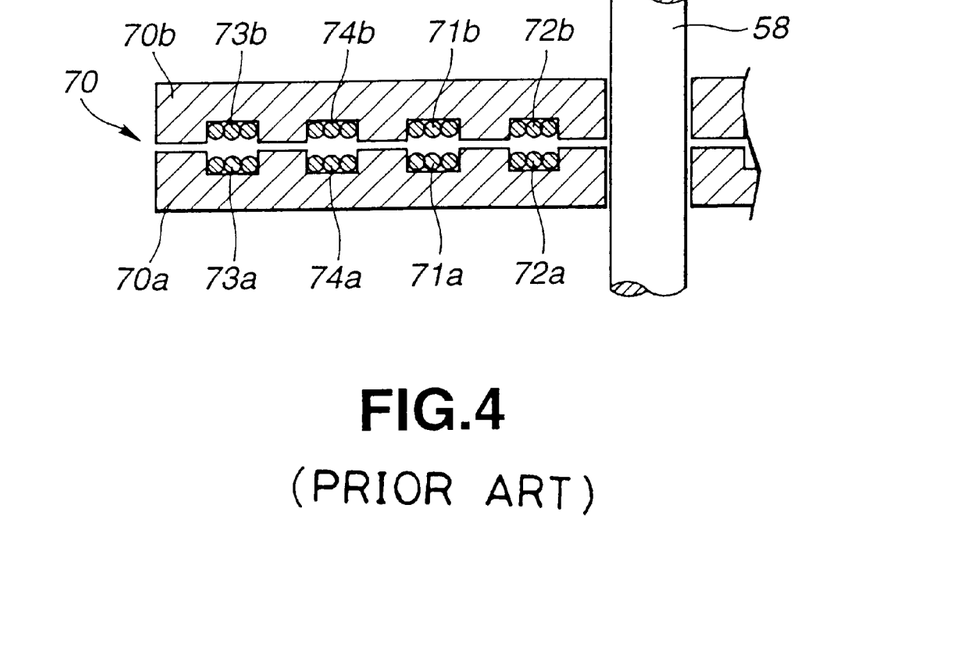
FIG. 4 is a cross sectional view showing an essential portion of a rotary transformer as an example.
Figure 5:
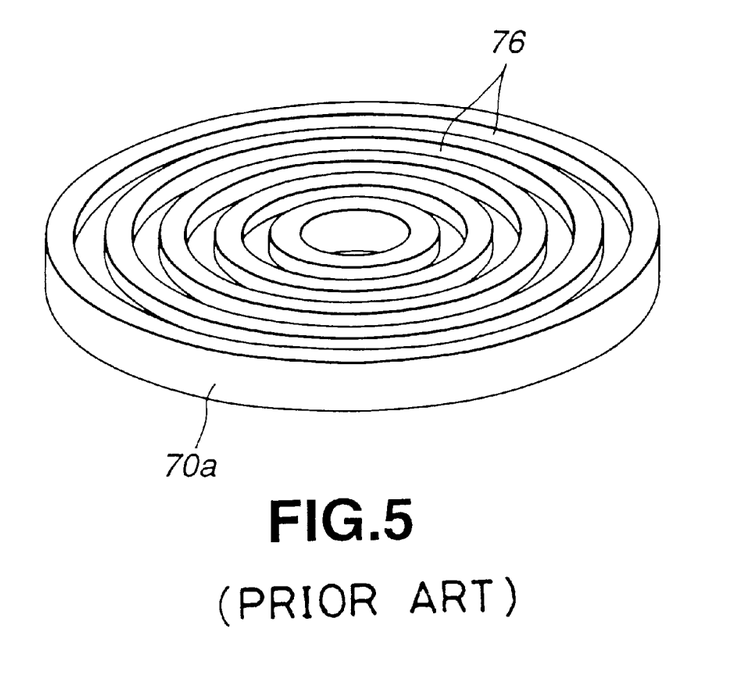
FIG. 5 is a perspective view showing a simplified configuration of a core of the rotary transformer.

FIG. 4 is a cross sectional view showing the rotary transformer 70 as an example including a fixed side core 70a and a rotary side core 70b which are arranged to oppose each other via a clearance. Each of the cores, as shown in FIG. 5, has a number of concentric circular grooves 76 corresponding to a number of recording/reproduction channels formed on the opposing sides. The windings 71b to 74a are mounted in the grooves of the fixed side and the windings 71b to 74b are mounted in the grooves of the rotary side. In the rotary transformer 70 having the aforementioned configuration, the clearance present between the cores 70a and the 70b causes a large transmission loss compared to a transformer having no clearance.

The transmission loss of this rotary transformer 70 results in a reduction of a weak reproduction head output signal, which in turn reduces the signal ratio with respect to an amplifier noise, so-called SN ratio, deteriorating the quality of the amplifier output signal.

Figure 6:
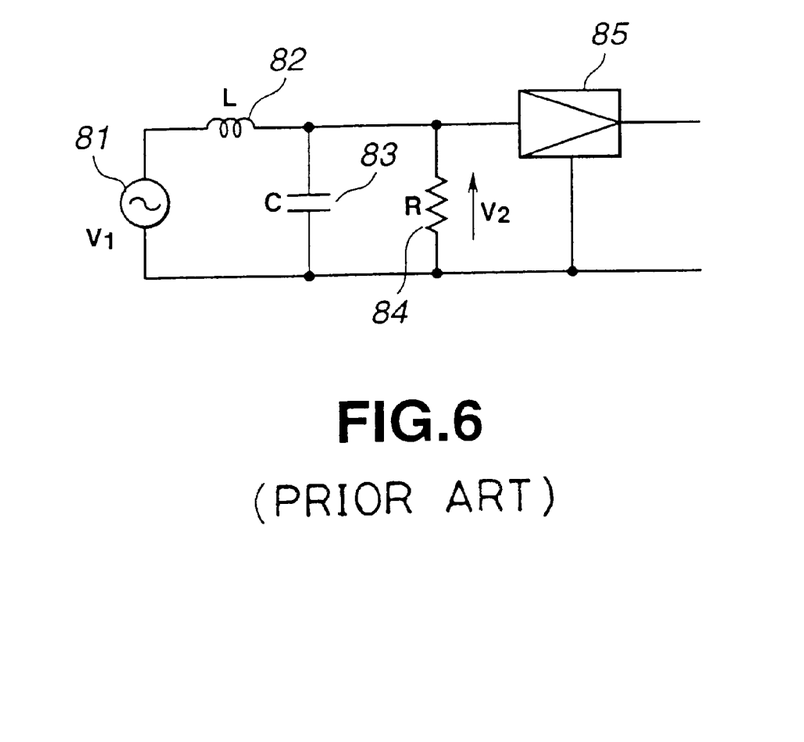
FIG. 6 is a circuit diagram showing a circuit configuration equivalent to a circuit from a reproduction head to a reproduction initial stage amplifier.

Next, FIG. 6 shows a circuit configuration equivalent to a circuit from the reproduction head to the reproduction initial stage amplifier. A signal source 81 represents a reproduction head electro motive force voltage $v_1$, and a coil 82 represents a head inductance L. A capacitor 83 represents a capacity C as a total of the amplifier input capacity, the wiring capacity, and the rotary transformer capacity. A resistor 84 represents a resistance component in parallel to the head L in addition to a parallel synthesis value R of a damping resistance. These are connected to an input side of the reproduction initial stage amplifier 85.

Figure 7:
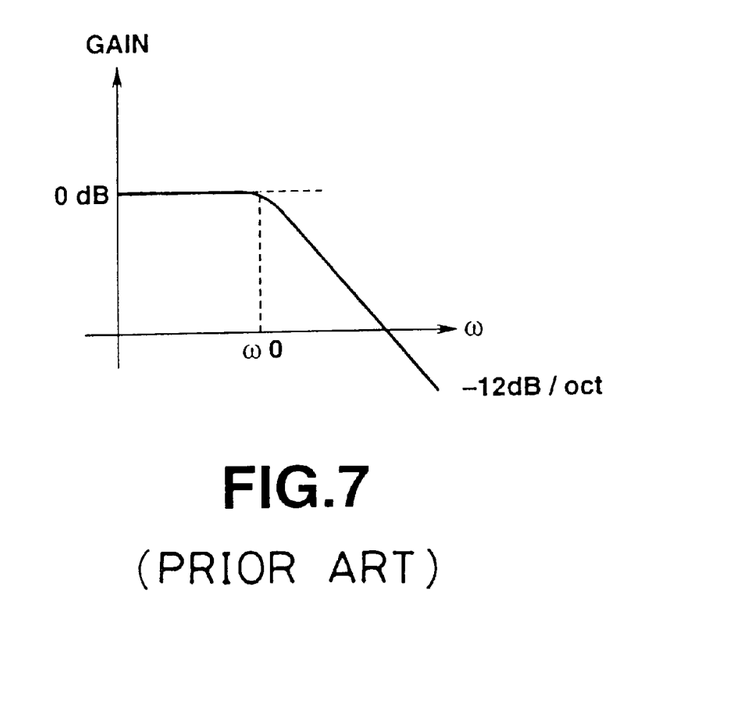
FIG. 7 shows an example of the frequency characteristic of the equivalent circuit of FIG. 6.

As is clear from this FIG. 6, the head inductance L and the capacity C at the amplifier input terminal constitute a low pass filter. This low pass filter brings about a cut-off frequency $\omega_0$ having a characteristic as shown in FIG. 7 which determines an upper limit of a frequency band of this system. It should be noted that the aforementioned cut-off frequency $\omega_0$ is, for example, as follows:

$$\omega_0 = 1/\sqrt{(LC)}$$

The capacity C obtained at the amplifier input side includes an input capacity of the amplifier itself to which is also added a capacity parallel to the windings of the rotary transformer as well as the winding capacity between the head and the rotary transformer and between the rotary transformer and the amplifier, which may be greater than the input capacity of the amplifier itself, limiting the frequency band.

To cope with this, there is a case when the reproduction initial stage amplifier is provided on the rotary drum.

This make it possible to eliminate attenuation of the reproduction signal due to the aforementioned loss in the rotary transformer as well as to reduce the capacity of the amplifier input side, extending the frequency band.

Figure 8A:
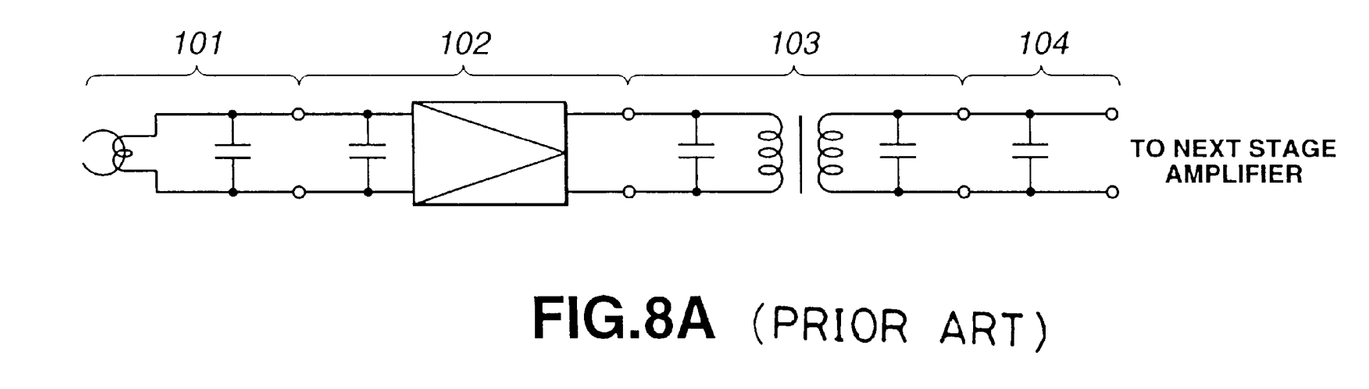
FIG. 8A shows an equivalent circuit diagram in which a reproduction initial stage amplifier is provided at a fixed side.
Figure 8B:
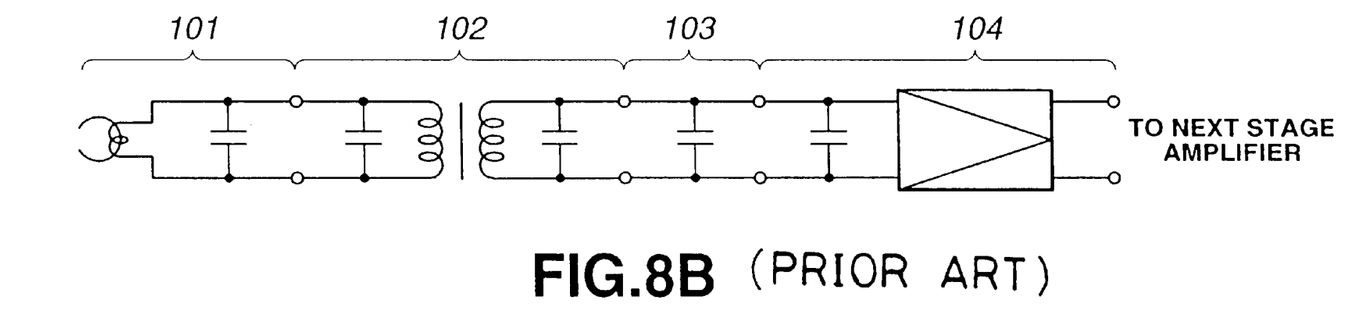
FIG. 8B shows an equivalent circuit diagram in which a reproduction initial stage amplifier is provided at a rotary side.

That is, FIG. 8A shows a case when a reproduction initial stage amplifier 104 is provided at the fixed side. In this case, between a reproduction head 101 and a reproduction initial stage amplifier 104, there are connected in parallel the rotary transformer 102 and a cable 103. FIG. 8 B shows a case when a reproduction initial stage amplifier 112 is provided at the rotary side. In this case, a reproduction head 111 is provided in the vicinity of a reproduction initial stage amplifier 112, in which the amplifier input side has a capacity which is almost determined by the input capacity of the amplifier itself, increasing the cut-off frequency of the low pass filter, which in turn extends the frequency band. The output of the reproduction initial stage amplifier 112 is fed to the rotary transformer 113 and via a cable 114 to the next stage amplifier.

In the aforementioned case when the reproduction initial stage amplifier is provided at the rotary side, it is necessary that the amplifier operation power source power be supplied to the rotary drum side. For this, there is a known technique for transmitting power via the rotary transformer.

Figure 9:
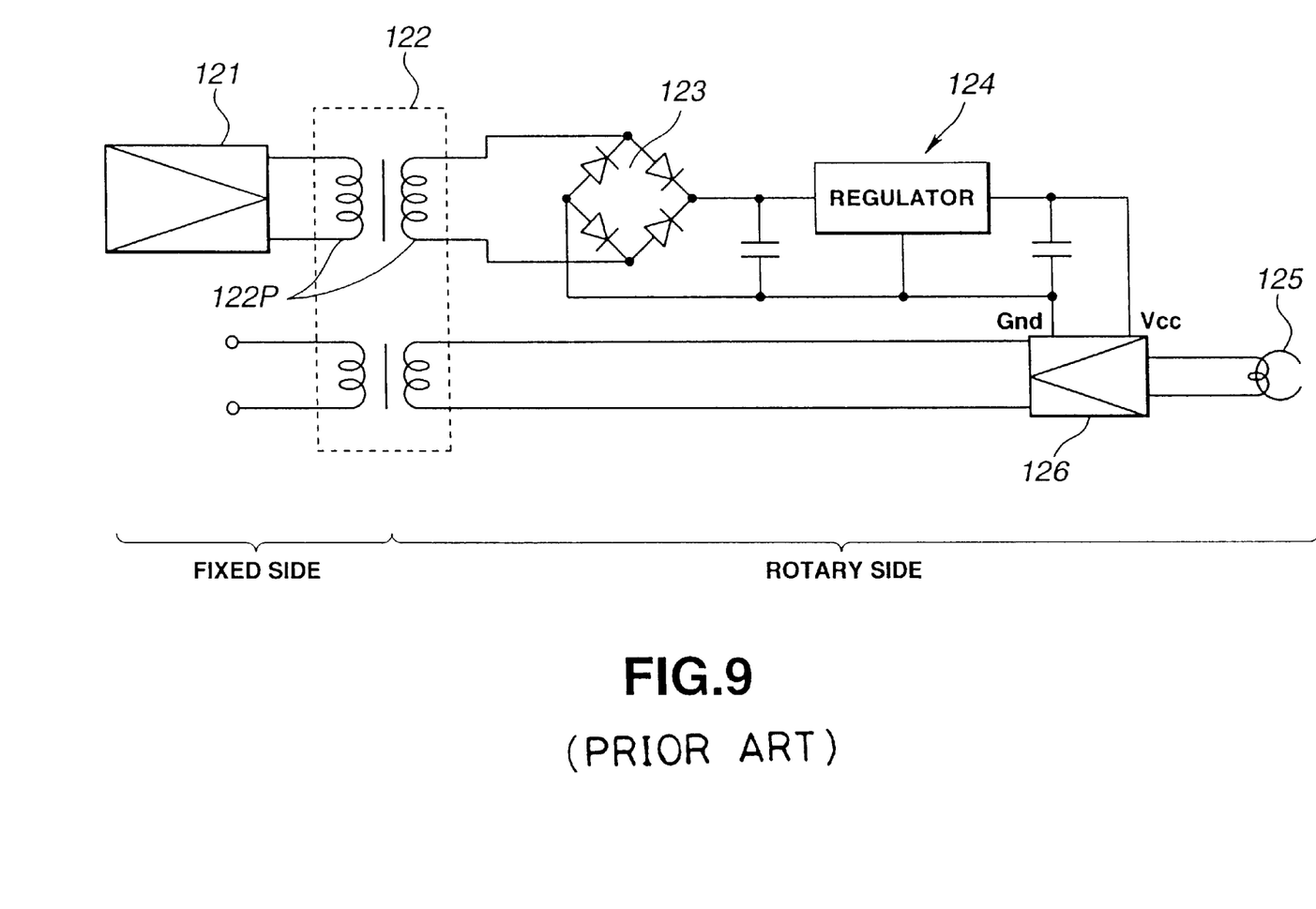
FIG. 9 is a block diagram for explaining a power supply when the reproduction initial amplifier is provided at the rotary side.

In this case, as shown in FIG. 9, a power transmission channel is added besides the recording/reproduction channels. That is, a power signal from a power supply driver 121 is supplied via windings 122P of a rotary transformer 122 to a rectifier circuit 123 for power supply via a smoothing voltage stabilizing block 124 to a reproduction initial stage amplifier 126. The reproduction initial stage amplifier 126 amplifies a reproduction signal from a reproduction head 125 and transmits the amplified signal via the rotary transformer 122 to the fixed side.

Figure 10:
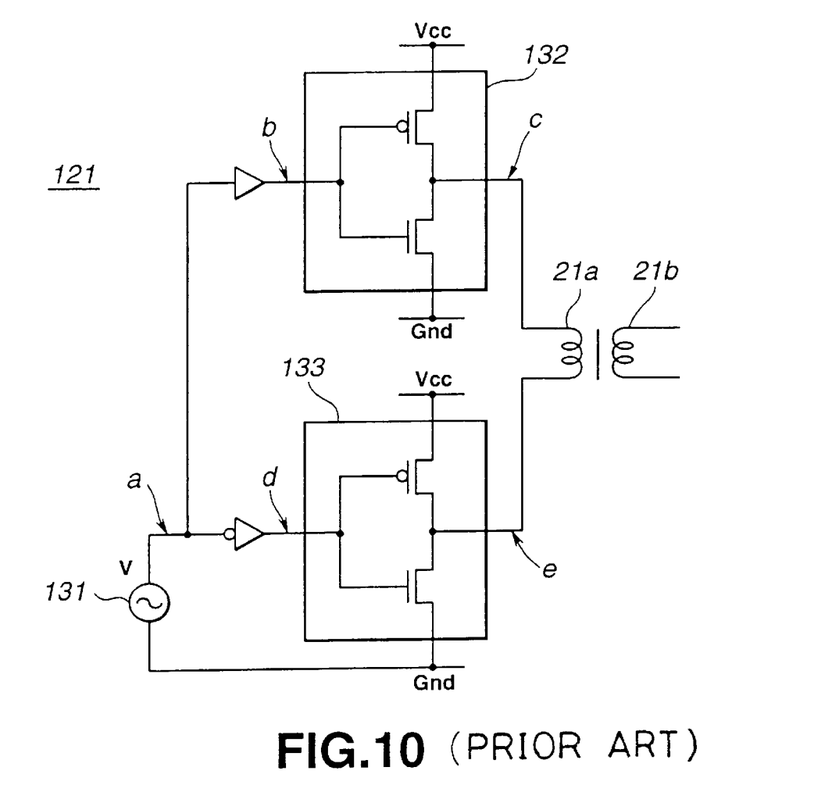
FIG. 10 is a circuit diagram schematically showing a configuration example of a power supply driver of FIG. 9.
Figure 11A:
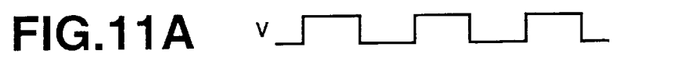
FIGS. 11A–11F show operation waveforms of respective portions in FIG. 10.
Figure 11B:
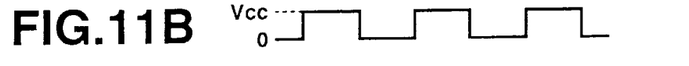
Figure 11C:
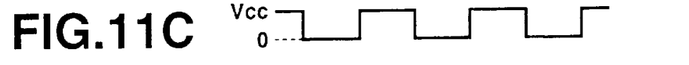
Figure 11D:
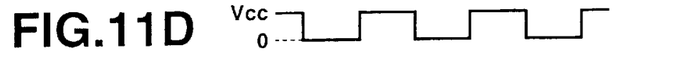
Figure 11E:
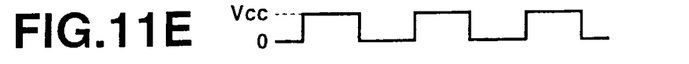
Figure 11F:
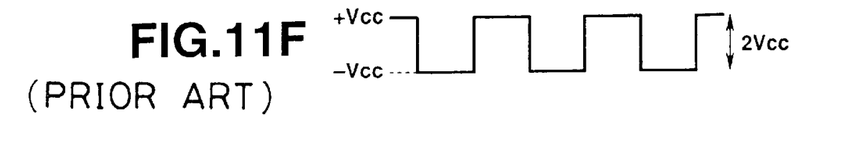

FIG. 10 shows a configuration example of the power supply driver 121 shown in FIG. 9. Power from an AC power source 131 is supplied via a CMOS driver circuits 132 and 133 to the fixed side winding of the rotary transformer. Respective portions a to e in FIG. 10 have signal waveforms as shown respectively in FIG. 11A to FIG. 11E. FIG. 11F shows a push-pull output from the two CMOS driver circuits 132 and 133 supplied to the fixed side winding of the rotary transformer, which is equivalent to a difference between the aforementioned signals c and e, i.e., c–e.

However, the configuration as shown in FIG. 9 has a problem that a signal in the power transmission channel, passing through the rotary transformer windings or air, reaches the recording/reproduction signal system, lowering the signal noise ratio. Especially, this significantly affects the reproduction head output which is a weak signal.

SUMMARY OF THE INVENTION

It is therefore an object of the present invention to provide a signal reproduction apparatus and method which enable to prevent adverse affects from the power transmission channel even if the reproduction initial stage amplifier is provided at the rotary side of the rotary head apparatus.

In order to achieve the aforementioned object, the present invention reproduces a signal recorded on a tape-shaped recording medium by a reproduction head of a rotary head block and taking out a reproduction signal from the reproduction head via a rotary transformer, wherein the rotary head block includes: a reproduction initial stage amplifier for amplifying a signal from the reproduction head, a rectifier circuit, and power accumulation means, so that during a non-reproduction operation period of the reproduction head, a power signal is supplied via the rotary transformer to the rectifier circuit and a rectified output power from the rectifier circuit is supplied to the reproduction initial stage amplifier and accumulated in the power accumulation means, and during a reproduction operation of the reproduction head, an accumulated power from the power accumulation means is supplied to the reproduction initial stage amplifier.

Here, the rotary head block may be provided with not only the reproduction head but also a recording head, but the recording operation and the reproduction operation should not function simultaneously.

The aforementioned rotary transformer carries out transmission of signals of all the channels to the aforementioned rotary head block by using a plurality of pairs of windings within a transformer and it is preferable that the channels be arranged in the order of a power signal, reproduction signal, and recording signal in the radial direction from center to outside.

Moreover, the aforementioned rectifier circuit of the rotary head block is preferably a voltage doubler rectifier circuit for multiplying an input voltage for output.

As no power transmission is carried out during a reproduction channel signal transmission, it is possible to prevent an adverse affects from the power transmission signal to a weak reproduction head output.

DETAILED DESCRIPTION OF PREFERRED EMBODIMENTS

Hereinafter, description will be directed to a signal reproduction apparatus according to a preferred embodiment of the present invention with reference to the attached drawings.

Figure 12:
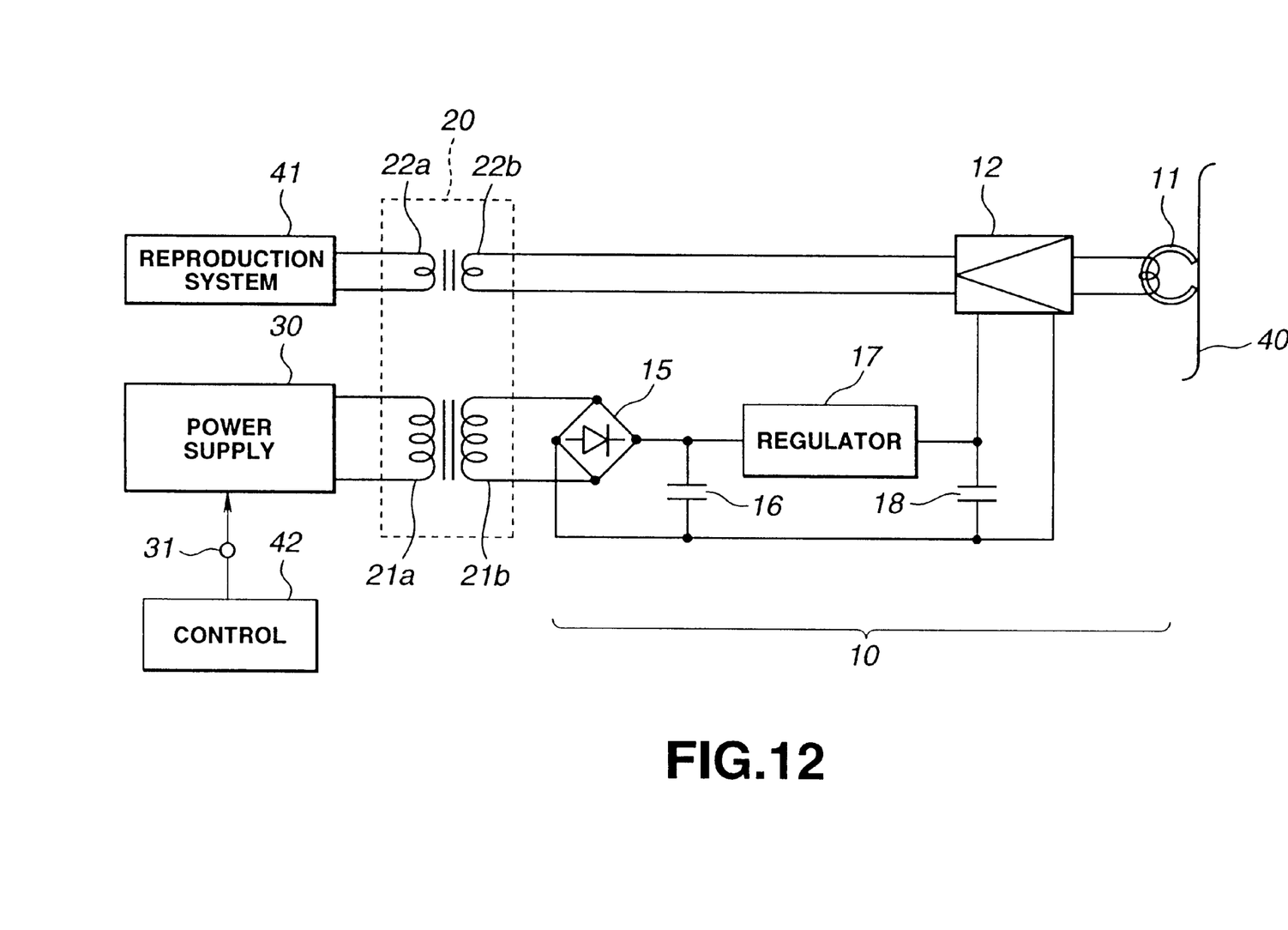
FIG. 12 is a block diagram showing a configuration example of an embodiment of the present invention.

FIG. 12 shows an example of signal reproduction apparatus according to an embodiment of the present invention.

In this FIG. 12, a rotary head block 10 is a block which is provided on the aforementioned rotary drum and a rotary disc. This block constitutes together with the aforementioned fixed drum a cylindrical body, along which a magnetic tape 40 as a tape-shaped recording medium is guided to travel. According to its rotation, a reproduction head 11 slides along the magnetic tape for reproduction operation. Here, the reproduction operation of the reproduction head 11 is carried out within a period of time while the reproduction head 11 is in contact with the magnetic tape 40. For example, in a case of 90° winding, for each one rotation period, reproduction operation is intermittently carried out at a time ratio of ¼ of the period. It should be noted that in a case when a plurality of reproduction heads are provided, the reproduction operation is successively carried out within a period of time while each reproduction head is in contact with the magnetic tape within one rotation period. In the present embodiment, it is assumed that the reproduction operation by a reproduction head is intermittently carried out and there exists a period during which no reproduction operation is carried out.

The rotary head block 10 in FIG. 12, besides the reproduction head 11 where, as has been described above, a reproduction operation is intermittently carried out according to the rotation, includes: a reproduction initial stage amplifier 12 connected to this reproduction head 11; a rectifier circuit 15 for supplying power to this reproduction initial stage amplifier 12; and a capacitor 16 for accumulating power from the rectifier circuit 15 to the reproduction initial stage amplifier 12, so that the accumulated power is supplied to the reproduction initial stage amplifier 12 when no power is supplied from the rectifier circuit 15. The capacitor 16 also serves as a smoothing capacitor for smoothing a rectified output from the rectifier circuit and is connected to a regulator 17 for stabilizing the power source voltage, so that a stable power source power can be supplied via a capacitor 18 to the reproduction initial stage amplifier. Besides, the rotary head block 10 is provided with another set of a reproduction head and a reproduction initial stage amplifier as well as recording heads for two channels and a recording/reproduction head instead of recording-dedicated head and a reproduction-dedicated head, but these are not related to the scheme of the present invention and omitted in the explanation and in the figures.

A rotary transformer 20 is provided for transmission of an output signal from the reproduction initial stage amplifier 12 of the rotary head block 10 and a power signal to the rectifier circuit 15. The rotary transformer 20 has windings 21b and 22b of the rotary side which are arranged to oppose to the windings 21a and 22a, respectively, so as to be electromagnetically connected to each other. The winding 21b of the rotary side is connected to the rectifier circuit 15, and the winding 22b of the rotary side is connected to the reproduction initial stage amplifier 12.

Moreover, at the fixed side, a power supply circuit 30 is provided for supplying the aforementioned power signal to the rotary transformer 20 and stops supply of the power signal during a reproduction operation of the reproduction head 11 of the rotary head block 10. The power signal from this power supply circuit 30 is supplied to the fixed side winding 21a of the rotary transformer 20. The power supply circuit has a control terminal 31 which is supplied with a power supply stop control signal form a control circuit 42. Moreover, the fixed side winding 21a of the rotary transformer 20 is connected to a signal reproduction system circuit block 41 for RF demodulation, error detection and correction, and the like.

Figure 13:
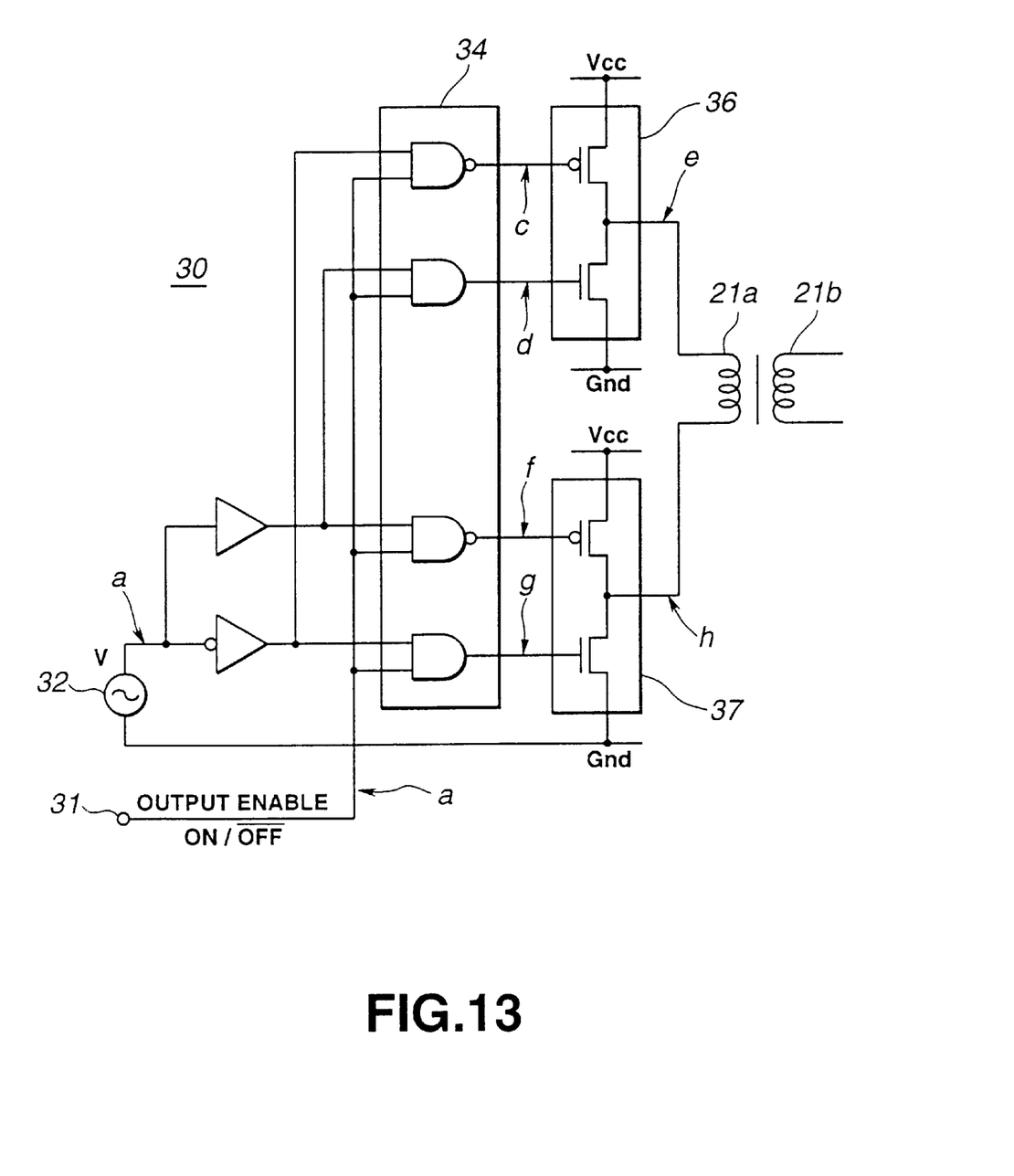
FIG. 13 is a block diagram showing a configuration example of a power supply circuit of FIG. 12.
Figure 14:
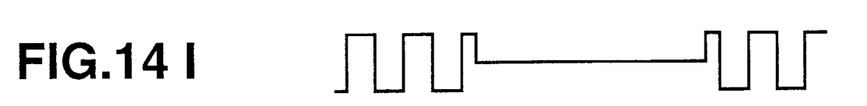
FIGS. 14A–14I show waveforms at respective portions of the power supply circuit in FIG. 13.
Figure 14A:
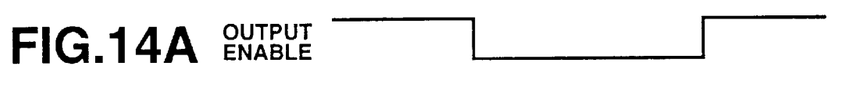
Figure 14B:
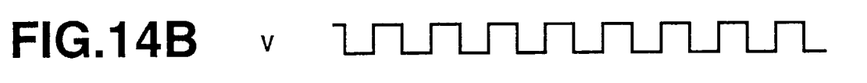

The power supply circuit 30, for example, may have a configuration as shown in FIG. 13. In this FIG. 13, the control terminal 31 is supplied with an output enable signal a for stop control of the power supply. FIG. 14A shows an example of this output enable signal "a". Moreover, an AC power source (oscillator) 32 transmits an output signal "b" (voltage v) as shown in FIG. 14B having a frequency, for example, in the order of several tens to several hundreds kHz. This output signal "b" is transmitted while partially reversed to a gate control circuit 34. The gate control circuit 34 has an AND gate and a NAND gate, and shuts out the input signal if the output enable signal a from the control terminal 31 is "L" (low level) and passes the input signal if the output enable signal a is "H" (high level). This gate control circuit 34 transmits output signals c, d, f, g which are respectively fed to CMOS driver circuits 36 and 37. Furthermore, an output signal "e" from the CMOS driver circuit 36 is supplied to one of the terminals of the fixed side winding 21a of the rotary transformer 20, whereas an output signal "h" from the CMOS driver circuit 37 is supplied to the other terminal of the aforementioned fixed side winding 21a. Thus, a difference of these output signals e and h, i.e., e–h is applied between the two terminals of this fixed side winding 21a. FIG. 14C to FIG. 14H show examples of these signals c to h, and FIG. 14I shows an example of the signal e–h.

Figure 14C:
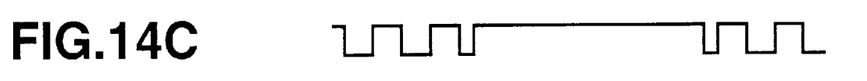
Figure 14D:
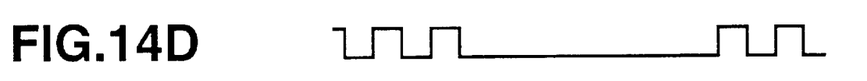
Figure 14E:
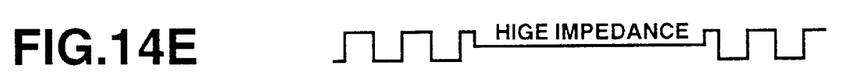
Figure 14F:
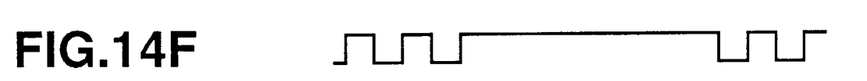
Figure 14G:
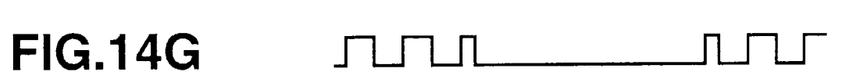
Figure 14H:
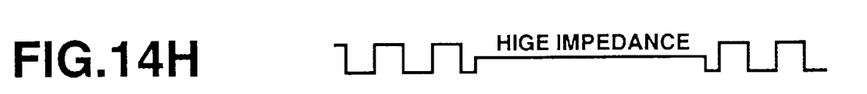

Here, When the aforementioned output enable signal a has become "L" and the input signal is shut out by the gate control circuit 34, the respective output signals c, d, f, g from the gate control circuit 34 are, for example, as shown in FIG. 14C, D, F, G, i.e., the signals c and f to respective P channel MOS transistors of the CMOS driver circuits 36 and 37 become "H" and the signals d and g to respective N channel MOS transistors become "L". Consequently, all the MOS transistors of the P channel and N channel are in an OFF state and the output e and h from the respective CMOS driver circuits 36 and 37 are in a high impedance state as shown in FIG. 14E and FIG. 14H for example. At this moment, the power supply from the power supply circuit 30 is stopped or cut off.

Thus, the aforementioned output enable signal a is made "L" when the reproduction head 11 of the rotary head block 10 in FIG. 12 is in reproduction operation state. That is, in a case when a plurality of reproduction heads are provided, at least one of the reproduction heads is in reproduction operation state.

As the power supply is stopped during a reproduction operation of a reproduction head, the power used during this reproduction is obtained by utilizing an electric charge discharged from a capacitor 16 connected to the rectifier circuit 15. In general, when a capacitor of capacitance C discharges for time t with a current i, the voltage change $\Delta V$ can be expressed as follows.

$$\Delta V = -it/C$$

Figure 15:
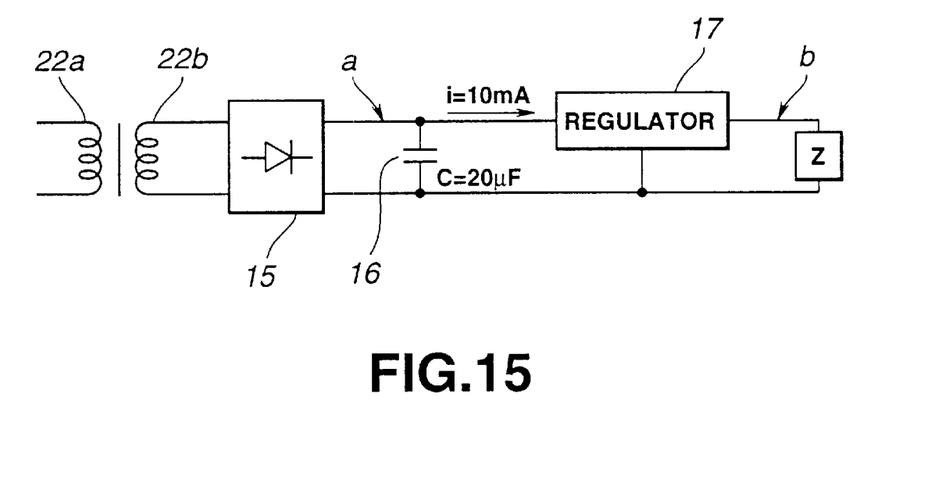
FIG. 15 is a block diagram for explaining the power supply in the rotary head portion.
Figure 16A:
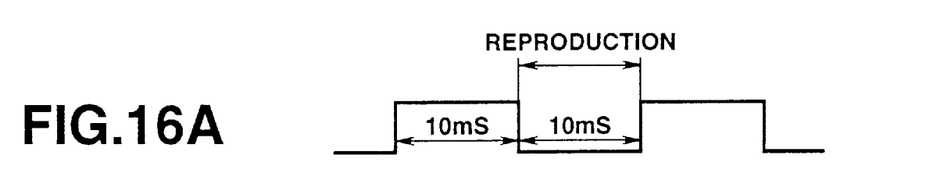
FIGS. 16A–16C show waveforms for explanation of power supply operation in the rotary head portion.
Figures 16B, 16C:
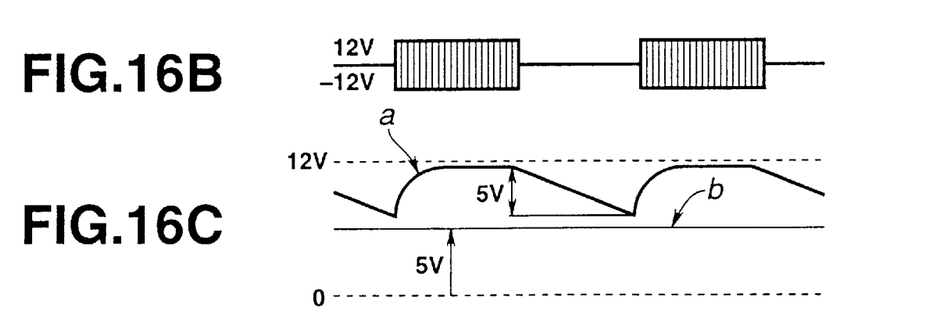

Here, a specific example will be considered, assuming, as shown in FIG. 15 and FIG. 16, that a reproduction period by a reproduction head is 10 ms; current i=10 mA; and a voltage drop from the full charge is up to 5V. In this case, if the capacitor 16 has a capacitance of C=20 $\mu$F, the voltage drop can be suppressed to 5V. For example, if the voltage after being stabilized by the regulator 17 is 5V, it is possible to supply power without any problem. FIG. 16A shows the aforementioned output enable signal of the power supply; FIG. 16B shows a power signal transmitted via the rotary transformer; and FIG. 16C shows an output voltage a after rectification and a voltage b after voltage stabilization by the regulator 17. As is clear from the stabilized power source output voltage b shown in FIG. 16C, even if the power supply via the rotary transformer is cut off during a reproduction operation period, the accumulated charge of the capacitor 16 can continuously supply power to the reproduction amplifier.

Figure 17:
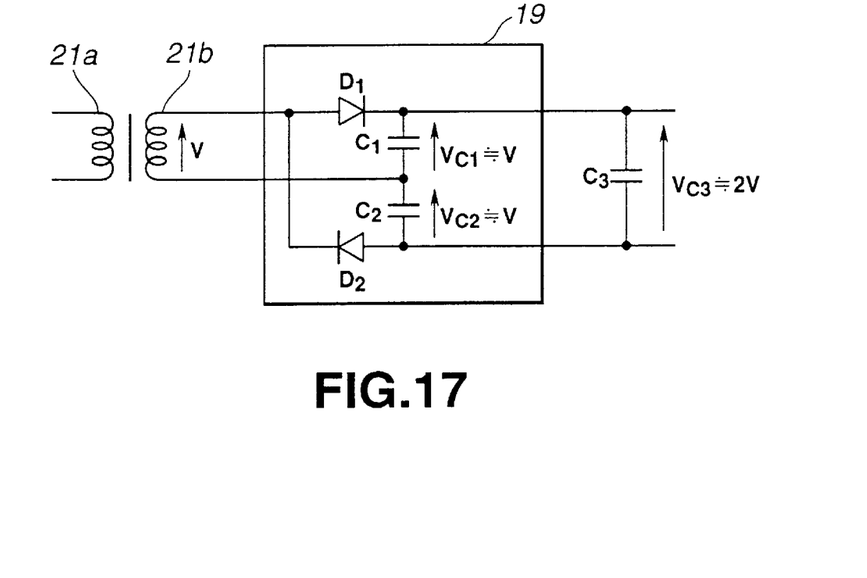
FIG. 17 is a block diagram showing a configuration example of a voltage doubler rectifier circuit.

Now, the rectifier circuit 15 in the aforementioned FIG. 12 is, for example, a full-wave rectification circuit using four diodes bridged, but it is also possible to use a voltage doubler rectifier which doubles a voltage during rectification. FIG. 17 shows such a voltage doubler rectifier circuit. In the voltage doubler rectifier circuit 19 of this FIG. 17, when an input voltage v supplied via the rotary side winding 21b of the rotary transformer is positive, a diode $D_1$ is turned ON and a charge voltage $v_{c1}$ of a capacitor $C_1$ becomes almost the aforementioned voltage v, and when the aforementioned input voltage v is negative, a diode $D_2$ is turned ON and a charge voltage $v_{c2}$ of a capacitor $C_2$ becomes almost the aforementioned voltage v, thus generating in a capacitor $C_3$ a voltage $V_{c3}$ which is almost 2v.

By employing this voltage doubler rectifier circuit 19, the output voltage fed from the aforementioned power supply circuit 30 at the fixed side can be ½ of the voltage required in an ordinary full-wave rectifier circuit.

Figure 18A:
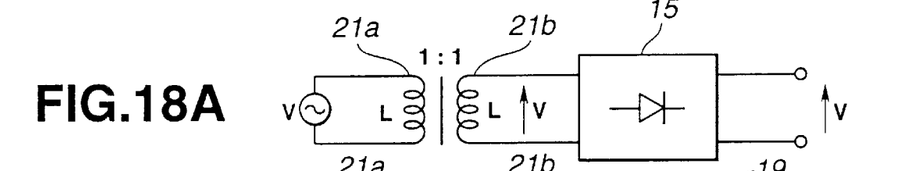
FIGS. 18A–18C show equivalent circuit diagrams schematically showing some examples of power supply via a rotary transformer.
Figures 18B, 18C:
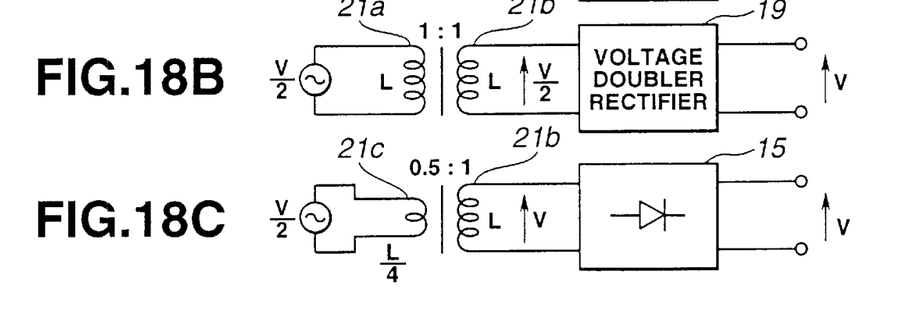

Here, in order to suppress the supply voltage at the fixed side to a lower level, as shown in FIG. 18C, it is possible to carry out a so-called step up by utilizing the winding ratio in the rotary transformer. That is, FIG. 18A shows a case of an ordinary power supply as in FIG. 12; FIG. 18B shows a case using a voltage doubler rectifier circuit as explained with reference to FIG. 17; and FIG. 18C shows a case of output voltage step-up by making the winding ratio of the rotary transformer as: fixed side winding 0.5: rotary side winding 1.

However, in the case of FIG. 18C, the fixed side winding 21a of the rotary transformer becomes ½ of the ordinary turns, decreasing the inductance of the transformer to ¼ viewed from the aforementioned power supply circuit 30. This is because, originally, in order to increase the transmission efficiency of the rotary transformer, both of the primary and the secondary windings of the transformer need to increase inductance, and each of the windings 21a and 21b has winding turns at the upper possible limit. Consequently, when obtaining the aforementioned step-up ratio of 2, there is no other way than to decrease the number of turns of the fixed side winding 21c of FIG. 18C to ½ of the upper limit. Thus, the number of turns is reduced to ½ and the inductance is reduced to ¼.

Figure 19:
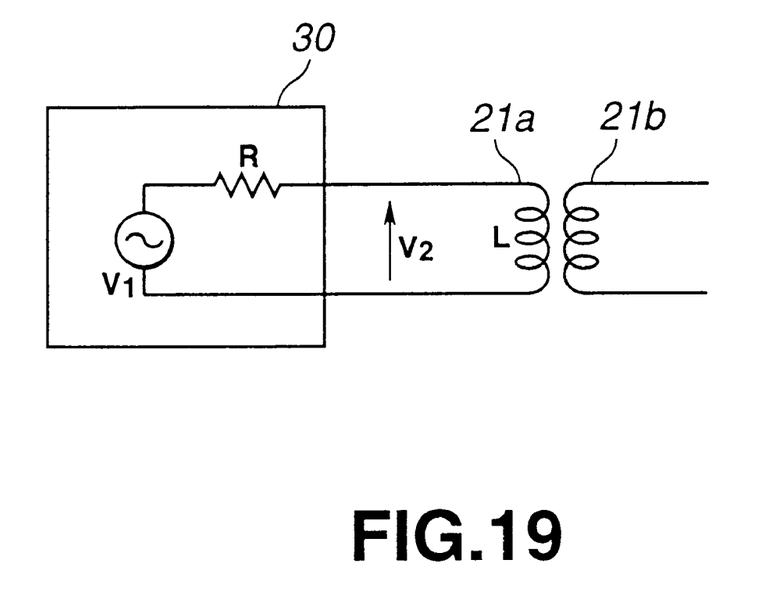
FIG. 19 is an equivalent circuit diagram for explaining a high pass filter formed by a power supply circuit and a rotary transformer.
Figure 20:
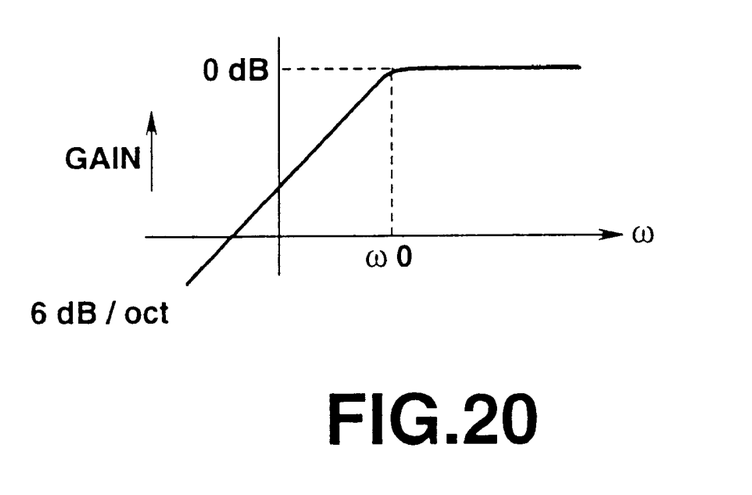
FIG. 20 shows an example of frequency characteristic of the high pass filter formed by the power supply circuit and the rotary transformer.

FIG. 19 shows a circuit equivalent to the power supply circuit 30 of the aforementioned FIG. 12 and the rotary transformer. In this FIG. 19, if the power supply circuit 30 has an output R, a high pass filter (HPF) is formed between the power supply circuit 30 and the inductance L of the transformer, lowering the power transmission efficiency in a lower frequency. This HPF has a cut-off frequency which can be expressed as follows:

$$f_0 = R/(2\pi L)$$

and the HPF has a transmission characteristic as shown in FIG. 20. In this FIG. 20, $\omega_0 = 2\pi f_0$.

In an ordinary helical scan recording/reproduction system such as a so-called DAT (digital audio tape recorder) and a digital VTR, the recording/reproduction signal frequency band is normally from 1 MHz to several tens of MHz. In order to suppress the effects of the power transmission signal on the recording/reproduction channels, it is advantageous to use for the power transmission signal a frequency as low as possible. However, there is a problem that if the transformer is stepped-up as explained above, the lower limit of the power transmission frequency is lowered.

In contrast to this, when the aforementioned voltage doubler rectifier circuit 19 is used, it is possible to decrease the output voltage from the power supply circuit 30 to ½ without affecting to the (lower) limit of the power transmission frequency. This brings about various merits as follows. The power supply circuit 30 can have a low power source voltage, which in turn lowers the voltage transmitted via the rotary transformer, enabling to minimize intervention via air into the recording/reproduction system as well as reducing the cross talk in the rotary transformer.

Figure 21:
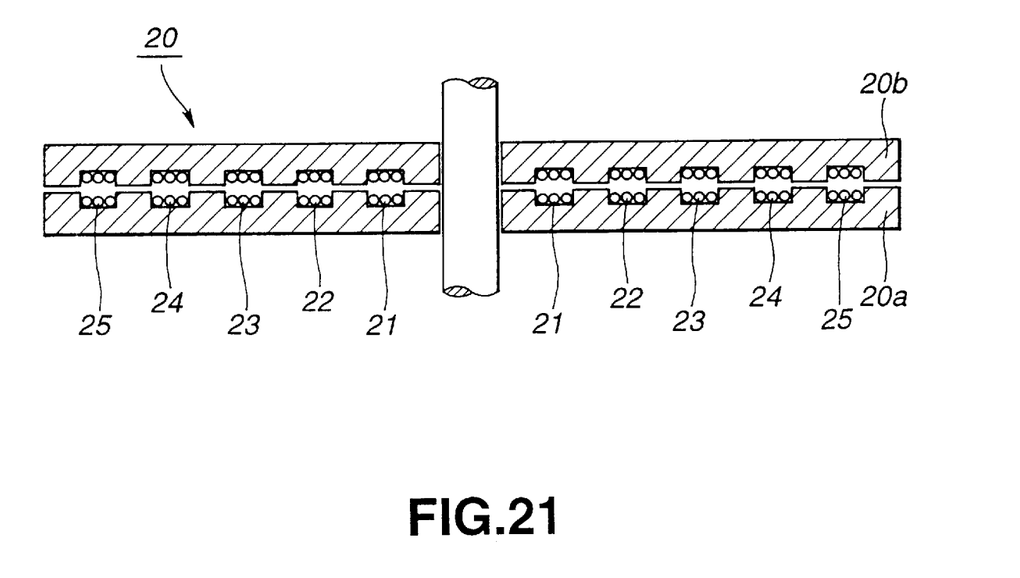
FIG. 21 is a cross sectional view showing an example of arrangement of a power channel winding, a reproduction channel winding, and a recording channel winding of the rotary transformer.

Next, description will be directed to a winding arrangement for respective channels in the rotary transformer with reference to FIG. 21.

FIG. 21 shows a winding arrangement in the rotary transformer 20 in a case when using two recording channels and two reproduction channels. In this FIG. 21, the fixed side core 20a is arranged so as to oppose to the rotary side core 20b. Each of the cores 20a and 20b has 5 pairs of concentric grooves, respectively opposing to each other, so that in these 5 pairs of grooves, there are provided in the direction from the center toward the outer circumference, a winding 21 for power transmission, windings 22 and 23 for reproduction signal transmission, and windings 24 and 25 for recording signal transmission.

This arrangement can be explained as follows. Firstly, within a transformer, there is a large cross talk between channels, normally causing a signal of ¹/₁₀ size leaking to an adjacent channel. In the aforementioned embodiment of the present invention, transmission of a power signal is halted during a reproduction operation and there is no adverse affect of the cross talk from the power signal to the reproduction channel. This enables to arranging a power channel and a reproduction channel in the vicinity to each other and it becomes important to isolate the power channel from the recording channel. Consequently, it is preferable to arrange the power channel, reproduction channel, and recording channel in this order in the radial direction of the rotary transformer. Next, as the head is provided in the vicinity of the outer circumference of the rotary drum and the channel located closer to the outer circumference is closer to the head. Therefore, the power channel is arranged at the innermost circumference, which is followed by the reproduction channel and the recording channel toward the outer circumference. FIG. 21 shows the arrangement thus determined.

Thus, the arrangement of channel windings of FIG. 21 enables to minimize signal leakage from the power channel to the head. Furthermore, as the power channel is at the innermost circumference of the rotary transformer, there is an advantage that a wire connecting the aforementioned power supply circuit 30 and the winding of the rotary transformer can be passed in the vicinity of the drum shaft, without intersecting the recording/reproduction signal wires.

It should be noted that the present invention is not to be limited to the aforementioned embodiment. For example, the rotary block of the rotary head apparatus may be a rotary disc type other than the rotary drum and can have only a reproduction head, or both a reproduction head and a recording head, or a recording/reproduction head. Moreover, the voltage doubler rectifier circuit may have a configuration other than the one shown in the figure, and the voltage may be multiplied not only by 2 but also 3, 4, and the like. The present invention can be modified in various ways without departing from the scope of the invention.

As is clear from the above explanation, according to the present invention, a signal recorded on a tape-shaped recording medium is reproduced by a reproduction head of a rotary head block intermittently according to a rotation and a reproduction signal from the reproduction head is taken out via a rotary transformer, wherein the rotary head block is provided with a reproduction initial stage amplifier for amplifying a signal from the reproduction head, a rectifier circuit, and power accumulation means, so that during a nonreproduction operation period of the reproduction head, a power signal is supplied via the rotary transformer to the rectifier circuit, so as to supply a rectified output power from the rectifier circuit to the reproduction initial stage amplifier and to the power accumulation means; and during a reproduction operation of the reproduction head, an accumulated power from the power accumulation means is supplied to the reproduction initial stage amplifier. That is, no power transmission is carried out during a reproduction channel signal transmission, preventing an adverse affect of the power transmission signal to the reproduction head output.

Moreover, as the rectifier circuit of the rotary head block is a voltage doubler rectifier circuit for multiplying an input voltage for output, which enables to reduce an output voltage of a power source, reducing the load of the power supply circuit and minimizing the affect to a recording/reproduction system.

Furthermore, as the rotary transformer, a plurality of pairs of windings in a single transformer transmit signals of all the channels to the aforementioned rotary head block and the channels are arranged in the order of a power signal, a reproduction signal, and a recording signal from the inner circumference toward the outer circumference, so that the recording channel is at the farthest position from the power channel, enabling to minimize the affect to the recording channel.

What is claimed is:

1. A signal reproduction apparatus comprising:
   a rotary head block including a reproduction head along which a tape-shaped recording medium is applied, so that at least a reproduction operation is carried out intermittently according to rotation of said rotary head block, a reproduction initial stage amplifier connected to said reproduction head, a rectifier circuit for supplying electric power to said reproduction initial stage amplifier, and power accumulation means for accumulating electric power supplied from said rectifier circuit and for supplying an accumulated power to said reproduction initial stage amplifier when no power is supplied from said rectifier circuit;
   a rotary transformer for transmitting an output signal of said reproduction initial stage amplifier from said rotary head block and a power signal to said rectifier circuit; and
   a power supply circuit for supplying said power signal to said rotary transformer and for stopping a supply of said power signal during a reproduction operation of said reproduction head of said rotary head block, wherein
   said rotary transformer includes a power signal channel formed of a first pair of windings for transmitting the power signal and a reproduction signal channel formed of a second pair of windings for transmitting the output signal of said reproduction initial stage amplifier.

2. The signal reproduction apparatus as claimed in claim 1, further comprising a recording head mounted on said rotary head block; and
   a recording signal channel formed of a third pair of windings for transmitting an input signal to said recording head, wherein
   a recording operation by said recording head and a reproduction operation by said reproduction head are carried out without any temporal overlap.

3. The signal reproduction apparatus as claimed in claim 2, wherein said rotary transformer further includes a recording signal channel formed of a fourth pair of windings, and said channels are arranged in an order of the power signal channel, the reproduction signal channel, and the recording signal channel radially outwardly from an inner circumference of said rotary transformer.

4. The signal reproduction apparatus as claimed in claim 1, wherein said rectifier circuit comprises a voltage doubler rectifier circuit for multiplying an input voltage and outputting a multiplied voltage.

5. A signal reproduction method for reproducing a signal recorded on a tape-shaped recording medium by a reproduction head of a rotary head block and taking out a reproduction signal from said reproduction head via a rotary transformer, in which
   said rotary head block includes a reproduction initial stage amplifier for amplifying a signal from said reproduction head, a rectifier circuit, and power accumulation means, and
   said rotary transformer includes a power signal channel for transmitting a power signal and a reproduction signal channel for transmitting an output signal of said reproduction initial stage amplifier,
   the method comprising the steps of:
      during a nonreproduction operation period of said reproduction head, supplying a power signal via said rotary transformer to said rectifier circuit and supplying a rectified output power from said rectifier circuit to said reproduction initial stage amplifier and accumulating said power signal in said power accumulation means, and
      during a reproduction operation of said reproduction head, supplying the reproduction signal via said reproduction signal channel from the reproduction initial stage amplifier, and using an accumulated power from said power accumulation means to drive said reproduction initial stage amplifier.

6. A signal reproduction apparatus comprising:
   a rotary head block including a reproduction head along which a tape-shaped recording medium is applied, so that a reproduction operation is carried out intermittently according to the rotation of said rotary head block, a reproduction initial stage amplifier connected to said reproduction head, a rectifier circuit for supplying electric power to said reproduction initial stage amplifier, and power accumulation means for accumulating electric power supplied from said rectifier circuit to said reproduction initial stage amplifier and for supplying an accumulated power to said reproduction initial stage amplifier when no power is supplied from said rectifier circuit;
   a rotary transformer for transmitting an output signal of said reproduction initial stage amplifier from said rotary head block and a power signal to said rectifier circuit; and
   a power supply circuit for supplying said electric signal to said rotary transformer and stopping the supply of said power signal during a reproduction operation of said reproduction head of said rotary head block;
   wherein said rectifier circuit is a voltage doubler rectifier circuit for multiplying an input voltage and outputting a multiplied voltage.

* * * * *